US010599633B2

(12) United States Patent
Cadarette et al.

(10) Patent No.: US 10,599,633 B2
(45) Date of Patent: *Mar. 24, 2020

(54) CHANGE STREAM ANALYTICS FOR DATA REPLICATION SYSTEMS

(71) Applicant: International Business Machines Corporation, Armonk, NY (US)

(72) Inventors: Paul M. Cadarette, Hemet, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/481,521

(22) Filed: Apr. 7, 2017

(65) Prior Publication Data

US 2017/0286475 A1 Oct. 5, 2017

Related U.S. Application Data

(63) Continuation of application No. 15/090,633, filed on Apr. 5, 2016.

(51) Int. Cl.
*G06F 16/23* (2019.01)
*G06F 16/27* (2019.01)
(Continued)

(52) U.S. Cl.
CPC ........ *G06F 16/2358* (2019.01); *G06F 16/162* (2019.01); *G06F 16/221* (2019.01);
(Continued)

(58) Field of Classification Search
CPC ................. G06F 16/27; G06F 16/2358; G06F 16/24568; G06F 16/2438; G06F 16/2365;
(Continued)

(56) References Cited

U.S. PATENT DOCUMENTS 6,622,152 B1   9/2003   Sinn et al.
7,031,974 B1   4/2006   Subramaniam
(Continued)

OTHER PUBLICATIONS

List of IBM Patents or Patent Applications Treated as Related, Filed Apr. 7, 2017, 2 pages.
(Continued)

*Primary Examiner* — Michael Pham
(74) *Attorney, Agent, or Firm* — David B. Woycechowsky

(57) ABSTRACT

A computer-implemented method includes, by a streaming analytics component, identifying a source database table and a target database table. The target database table includes one or more target database rows and one or more target database columns. The method further includes identifying a change stream including a plurality of row-level modifications that cause the target database table to replicate the source database table. The method further includes determining that each row-level modification affects one or more common columns of the target database columns, wherein the common columns exhibit one or more common values for those of the target database rows that are affected by the row-level modifications. The method further includes generating, based on the common values and the common columns, a reconstructed modification statement and sending the reconstructed modification statement to an apply component. A corresponding computer program product and computer system are also disclosed.

20 Claims, 5 Drawing Sheets

(51) Int. Cl.
  *G06F 16/2455* (2019.01)
  *G06F 16/242* (2019.01)
  *G06F 16/22* (2019.01)
  *G06F 16/16* (2019.01)

(52) U.S. Cl.
  CPC .......... *G06F 16/23* (2019.01); *G06F 16/2365* (2019.01); *G06F 16/2438* (2019.01); *G06F 16/24568* (2019.01); *G06F 16/27* (2019.01); *G06F 16/273* (2019.01)

(58) Field of Classification Search
  CPC ...... G06F 16/221; G06F 16/162; G06F 16/23; G06F 16/273
  USPC .................................................. 707/691, 610
  See application file for complete search history.

(56) References Cited

U.S. PATENT DOCUMENTS

| | | | |
|---|---|---|---|
| 8,352,425 | B2 | 1/2013 | Bourbonnais et al. |
| 8,589,346 | B2 | 11/2013 | Lu et al. |
| 8,756,192 | B2 | 6/2014 | Wang et al. |
| 8,886,601 | B1 | 11/2014 | Landau et al. |
| 9,213,706 | B2 | 12/2015 | Long et al. |
| 9,456,014 | B2 | 9/2016 | Luo et al. |
| 9,767,178 | B2 | 9/2017 | Srivastava |
| 2001/0044795 | A1 | 11/2001 | Cohen |
| 2002/0029209 | A1 | 3/2002 | Bernal |
| 2006/0047713 | A1* | 3/2006 | Gornshtein ............. G06F 16/27 |
| 2009/0157764 | A1 | 6/2009 | Kundu |
| 2009/0216809 | A1 | 8/2009 | Horii |
| 2011/0173619 | A1 | 7/2011 | Fish |
| 2012/0136827 | A1 | 5/2012 | Wang |
| 2012/0136830 | A1 | 5/2012 | Patocka |
| 2012/0278282 | A1 | 11/2012 | Lu |
| 2014/0040203 | A1 | 2/2014 | Lu et al. |
| 2014/0236887 | A1 | 8/2014 | Nelson |
| 2015/0032695 | A1 | 1/2015 | Tran |
| 2015/0095287 | A1* | 4/2015 | Spyker ................ G06F 16/2386 707/648 |
| 2015/0269215 | A1 | 9/2015 | Lehouillier et al. |
| 2015/0347551 | A1 | 12/2015 | Shang |
| 2017/0060695 | A1 | 3/2017 | Clare |
| 2017/0116210 | A1 | 4/2017 | Park |
| 2017/0212891 | A1 | 7/2017 | Pundir |
| 2017/0269974 | A1 | 9/2017 | Arora et al. |
| 2017/0286472 | A1 | 10/2017 | Cadarette |
| 2017/0286513 | A1 | 10/2017 | Cadarette |
| 2017/0286515 | A1 | 10/2017 | Cadarette |

OTHER PUBLICATIONS

Cadarette et al., "Supplementing Change Streams", U.S. Appl. No. 15/090,634, filed Apr. 5, 2016, 30 pages.

Cadarette et al., "Change Stream Analytics for Data Replication Systems", U.S. Appl. No. 15/090,633, filed Apr. 5, 2016, 32 pages.

Kifer et al., "Detecting Change in Data Streams", Department of Computer Science, Cornell University, Proceedings of the 30th VLDB Conference, Toronto, Canada, 2004, pp. 180-191, <http://www.cse.psu.edu/~duk17/papers/change.pdf>.

Wulkan, Mike, "IBM InfoSphere Data Replication's Change Data Capture, Version 10.2.1 (Oracle), Performance Evaluation and Analysis", 2014, printed on Jan. 14, 2014, IBM InfoSphere Change Data Capture, Information Management software, pp. 1-21.

"Push-Down of Data Change Detection in Relational Database Systems", An IP.com Prior Art Database Technical Disclosure, Authors et al.: IBM, Original Publication Date: Nov. 4, 2008, IP.com No. 000176076, 4 pages.

* cited by examiner

CHANGE STREAM ANALYTICS FOR DATA REPLICATION SYSTEMS

BACKGROUND

The present invention relates generally to the field of change data replication systems, and more particularly to active analytics of live change streams in change data replication systems.

Change data replication systems provide data replication across remote databases. This may be done to achieve enhanced performance, security, and robustness in various networked systems that rely on common data. Such systems may be built using a Capture-Transport-Apply model, wherein a capture component captures changes from a source database, a transport component securely and robustly transports the change stream to the target system, and an apply component enters modifications into the target database. Recently available tools such as Apache™ Spark™ have made it possible to analyze the change stream in real time, which opens the door to performance enhancements through live processing of the change stream.

SUMMARY

A computer-implemented method includes, by a streaming analytics component, identifying a source database table and a target database table. The target database table includes one or more target database rows and one or more target database columns. The method further includes identifying a change stream. The change stream includes a plurality of row-level modifications, wherein application of the plurality of row-level modifications to the target database table causes the target database table to replicate the source database table. The method further includes determining that each of the plurality of row-level modifications affects one or more common columns of the one or more target database columns, wherein the one or more common columns exhibit one or more common values for those of the one or more target database rows that are affected by the plurality of row-level modifications. The method further includes generating, based on the one or more common values and the one or more common columns, a reconstructed modification statement and sending the reconstructed modification statement to an apply component. A corresponding computer program product and computer system are also disclosed.

In an aspect, another computer-implemented method includes, by a database management system, wherein the database management system manages a target database table, receiving a plurality of row-level modifications, each of the plurality of row-level modifications being for the target database table and receiving a reconstructed modification statement, wherein the reconstructed modification statement includes an operational clause and a WHERE clause. The computer-implemented method further includes testing the reconstructed modification statement against the target database table to yield a test result, and comparing the test result with the plurality of row-level modifications to yield an equivalence determination. The computer-implemented method further includes, responsive to the equivalence determination being positive, applying the reconstructed modification statement to the target database table in place of the plurality of row-level modifications.

DETAILED DESCRIPTION

Figure 1:
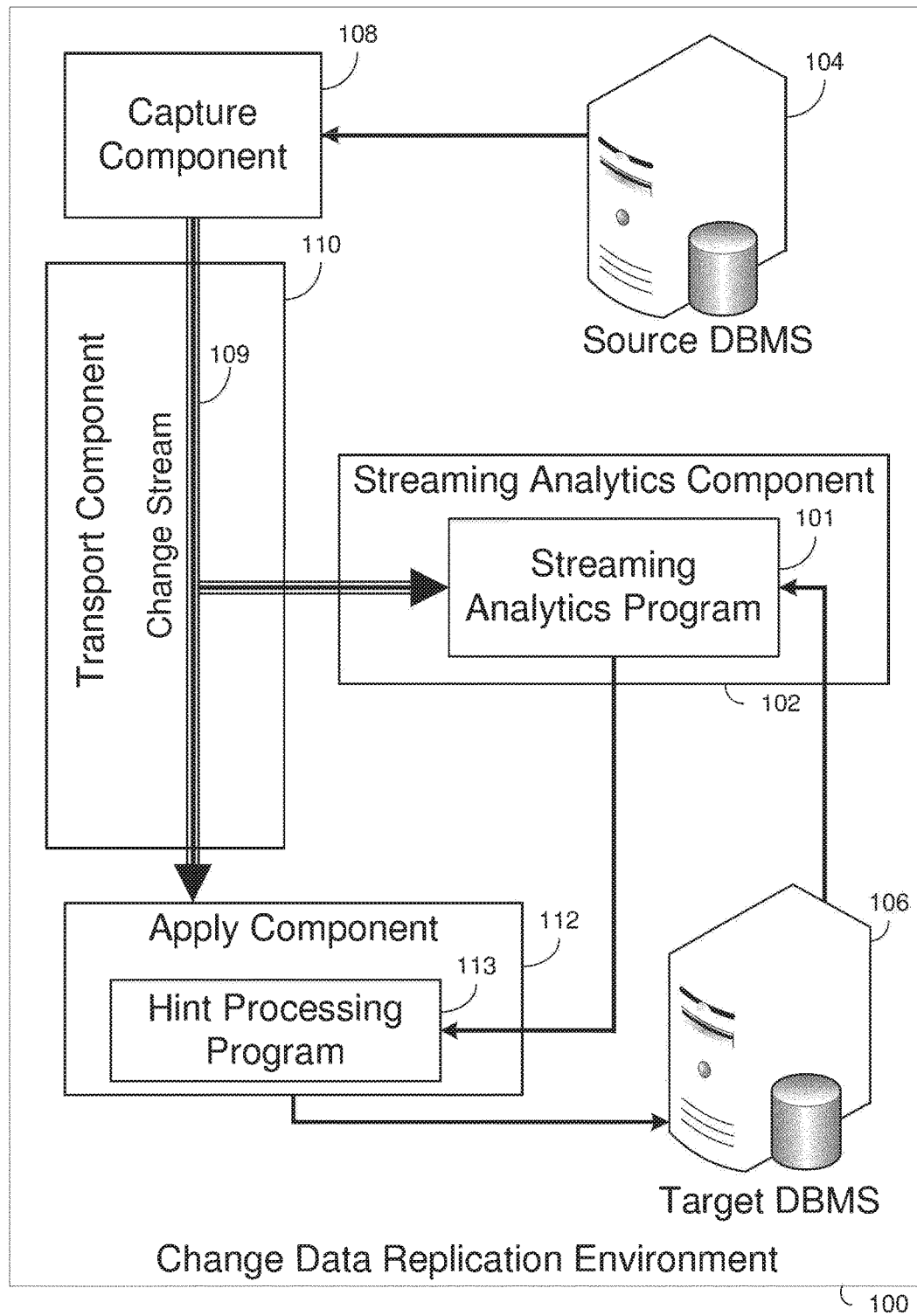
FIG. 1 is a block diagram illustrating a change data replication system environment, in accordance with at least one embodiment of the present invention.

Referring now to the invention in more detail, FIG. 1 depicts a change data replication environment 100 for a change data replication system. The change data replication system may be understood as any system that replicates data from one Database Management System ("DBMS") to another. The replicated data may include both the primary data store and metadata concerning the database and change stream. The DBMSs may include relational databases that are accessible by a variant of Selective Query Language ("SQL"). Such DBMSs include IBM® DB2®, Oracle® Database, Microsoft® SQL Server®, MySQL®, and others. The DBMSs may also include non-relational databases such as object databases, key-value stores, and document stores.

In the depicted embodiment, the change data replication environment 100 operates using a Capture-Transport-Apply model. In the Capture-Transport-Apply model, a capture component 108 detects database modifications in a source DBMS 104, and a transport component 110 moves the modifications from the source DBMS 104 to an apply component 112 as a change stream 109. The apply component 112 effects the changes on a target DBMS 106. In the depicted embodiment, the streaming analytics component analyzes the change stream 109 in real time. The streaming analytics component 102 may be implemented using a cluster computing framework such as Apache™ Spark™. It should be noted, however, that the invention is not limited in its applicability to particular software products or frameworks, and that the general functionality of real time analysis of change streams may be achieved, generally, by any physical, virtual, distributed, or localized computing environment that is configured to accept the change stream as input and provide suggestions to an apply component as output.

Figure 5:
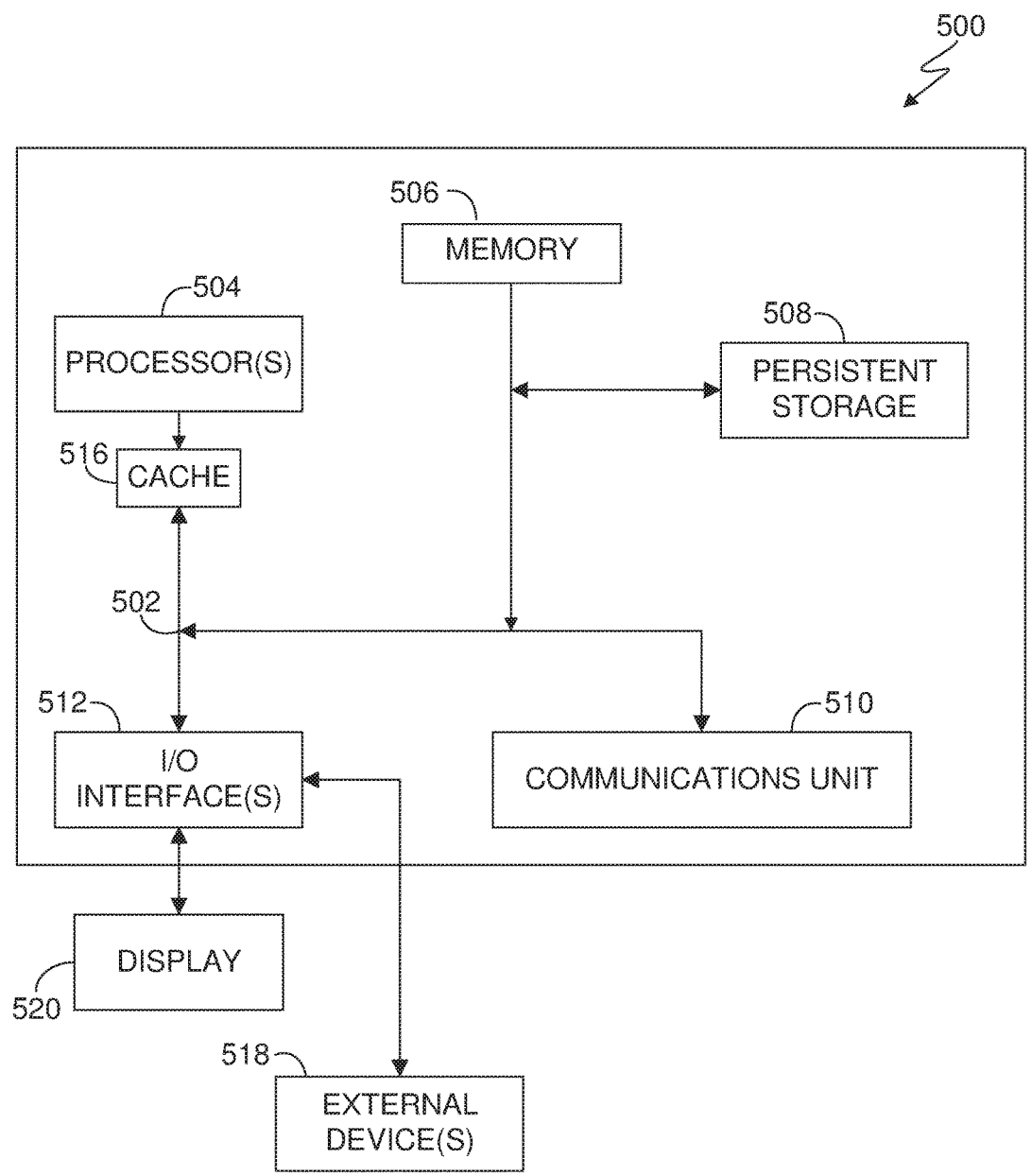
FIG. 5 is a block diagram depicting various logical elements for a computer system capable of executing program instructions, in accordance with at least one embodiment of the present invention.

The source DBMS 104 and the target DBMS 106 may operate on any physical or virtual computer or computing environment, such as the computing environment of FIG. 5. The source DBMS 104 and the target DBMS 106, whether on physical or virtual hardware, may be remote to one another communicating via a network, such as the Internet or a local Internet Protocol ("IP") network. The capture component 108 may be understood as a program or software module that operates "near" to the source DBMS 104, for example running on the same physical or virtual computer server or environment as the source DBMS 104. As used herein, "near" is a logical concept including embodiments where processes or components run on the same physical or virtual computer, on the same physical or virtual local network, etc. On the other hand, logical "near", as used herein, excludes embodiments where processes or components lack security privileges to communicate directly (even if on the same physical hardware) and embodiments where components or processes are too physically distant to communicate cooperatively in real time (even if sharing the same virtual environment or granted extensive privileges). Similarly, the apply component 112 may be understood as a program or software module that operates "near" to the target DBMS 106, for example running on the same physical or virtual computer server or environment as the target DBMS 106.

In the context of the apply component 112, "near", for various embodiments, may include the ability to operate synchronously with the target DBMS 106. Specifically, the target DBMS 106 may be configured with query privileges granted to a program embodying the apply component 112 and to withhold executing any modification from any source during various operations of the apply component 112. Thus, for such embodiments, the apply component 112 may perform analyses of the target DBMS 106 with the guaranty that any change entered by the apply component 112 in response to its analysis will be on data that is identical to what was queried, assuming that the target DBMS 106 was not damaged, corrupted, or improperly modified before or during the operation.

Referring still to the embodiment depicted in FIG. 1, the transport component 110 represents any combination of programs, software modules, protocols, and physical or virtual networks that handle transmission of the change stream 109 from the source DBMS 104 to the target DBMS 106. The streaming analytics component 102 is a program or software module operating on any physical or virtual computer or computing environment that has real time access to the change stream 109. The streaming analytics component has the capability to send downstream communication to the apply component 112, by which the streaming analytics component 102 reports results of its analysis to the apply component 112. The streaming analytics component also has the ability to receive upstream query data from the target DBMS 106, by which the streaming analytics component 102 can use the contents of the target DBMS 106 to inform its analyses. The streaming analytics component 102 need not be "near" to either the source DBMS 104 or the target DBMS 106. For the depicted embodiment and other embodiments, the streaming analytics component 102 is assumed to operate asynchronously to both the source DBMS 104 and the target DBMS 106. Equivalently, the streaming analytics component need not depend upon any guaranty that any query it runs against the target DBMS 106 is of a state that will not be changed by the time any optimization that it recommends is applied.

Referring still to the embodiment depicted in FIG. 1, the streaming analytics component 102 may include a streaming analytics program 101, which performs some or all of the functions of the streaming analytics component 102, as herein described. Similarly, the apply component 112 may include a hint processing program 113, which performs some or all of the functions of the apply components 112, as herein described. In particular, the streaming analytics program 101 may be embodied as a distributed process on top of Apache Spark that accesses the change stream 109 in real time and provides optimization hints downstream to the hint processing program 113. The hint processing program 113 may be embodied as a program or computer process that is "near" to and/or synchronous with the target DBMS 106, for example running on the same physical server hardware, or integrated into the target DBMS 106 process.

In an embodiment, the source DBMS 104 and the target DBMS 106 both operate relational databases accessed via a variant of SQL. Where SQL and relational models are used, the change stream 109 may be modeled a stream of row-level modifications: UPDATES and DELETES of single rows. By contrast, the source DBMS 104 may have been modified by an original modification statement that affected multiple rows. In alternative embodiments, the invention may also be applied to non-relational databases, some of which may be accessible via SQL as a front-end interface language. In non-relational systems that use an SQL front-end, the change stream 109 may continue to be modeled as row-level modifications, despite the internal representation of the data perhaps lacking a direct analogy to the rows and columns of a relational database. In non-relational systems that have neither an SQL front-end nor a row and column internal representation, individual data element modifications and deletes may be analogous to row-level modifications for purposes of the present invention. For example, the change stream 109 may include a list of changes and deletes to existing key-value pairs in a key-value store, which are analogous to UPDATE and DELETE statements in SQL. Similarly, for an object database, calls to an instance's deconstructor or equivalent method may be modeled as an SQL DELETE, and calls to any method whose function is to modify the object may be treated analogously to an SQL UPDATE for purposes of the present invention.

The inventors have observed and/or recognized that change streams, such as the change stream 109 often include long lists of single row deletes and single-row updates that set the same column to the same value. In the present context, a "long" list includes lists of hundreds, thousands, or tens of thousands of rows; functionally, a "long" list of rows may be understood as a sufficient number of row-level updates to create a significant load on the target DBMS 106. These row-level modifications are resource costly on the target DBMS 106 as compared with executing the original modification statement on the source DBMS 104. The inventors have further observed and/or recognized that serially processing many similar row-level modifications create a throughput bottleneck in a real-world data replication systems. By inspecting the state of the database before the change is applied, it is possible to reconstruct what the original SQL modification statement was, e.g., DELETE from Table1 WHERE col1="abc". By executing the reconstructed version of the original modification, it is possible to mitigate the performance deficit of applying row-level modifications. By intelligently verifying the reconstructed version of the original modification statement, it is possible to preserve data integrity guarantees while achieving a performance enhancement. While the foregoing recites various advantages of the invention and disadvantages of the prior art, it will be understood that neither any particular advantage need be present nor any particular disadvantage mitigated in any particular embodiment of the invention as described herein.

Figure 2:
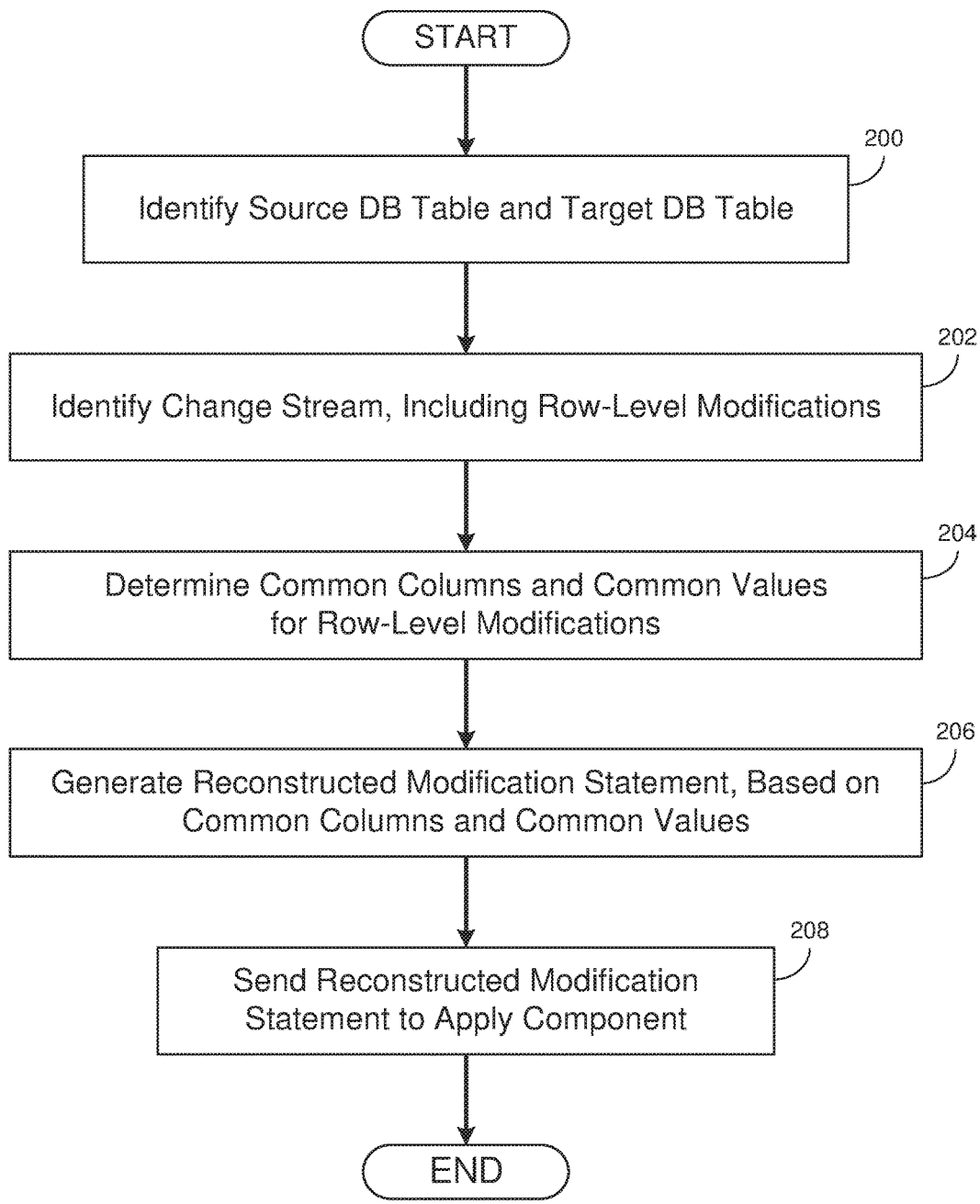
FIG. 2 is a flowchart diagram for a streaming analytics program, in accordance with at least one embodiment of the present invention.

Referring now to FIG. 2, FIG. 2 is a flowchart diagram for a streaming analytics program 101, in accordance with at least one embodiment of the present invention. At step 200, the streaming analytics program 101 identifies a source database table and target database table, which may be understood as particular corresponding tables on the source DBMS 104 and the target DBMS 106, respectively. The target database table includes one or more target database rows and target database columns. At step 202, the streaming analytics program identifies a change stream 109. The change stream 109 includes a plurality of row-level modifications, wherein application of the plurality of row-level modifications to the target database table causes the target database table to replicate the source database table. In various embodiments of the invention, the plurality of row-level modifications is expected to be a large plurality of hundreds or thousands of affected rows, or more. In other embodiments, it may be possible and useful to apply the concepts of the invention to small numbers of rows or even single-row modifications.

For purposes of the depicted flowchart, the streaming analytics program 101 may be understood as receiving, in the change stream 109, changes that affect only a single table in both the source DBMS 104 and the corresponding table in the target DBMS 106. It should be noted that, in embodiments that support change data replication environments, the target DBMS 106 replicates the source DBMS 104, and thus each table of the source DBMS 104 is expected to correspond to a table with identical columns and types in the target DBMS 106. The replicated source and target table may be a literal table replicated across SQL-accessible relational databases, a virtual table and/or view in such relational databases, or a structure analogized to a table as may be found in non-relational databases. In alternative embodiments, the streaming analytics program 101 may be configured to generate reconstructed modification statements that affect multiple tables simultaneously, for example, by generating multi-table or virtual table modification statements, as permitted by the particular DBMSs involved.

Similarly, for purposes of the depicted embodiment, the streaming analytics program 101 may be understood as receiving changes that are all of a given type, either UPDATE or DELETE. This assumption makes it possible to reconstruct a single modification statement that correctly generalizes the received changes. It should be noted that a below-described alternative embodiment recites one possible way of handling mixed UPDATE and DELETE statements by sorting into batches of like type and properties. For purposes of the embodiment depicted in FIG. 2, the type is unspecified and the streaming analytics program may, by the depicted steps, generate a reconstructed UPDATE or a reconstructed DELETE, achieving the generalization by starting with all UPDATEs or all DELETES. In alternative embodiments, the streaming analytics program 101 may be configured to generate a reconstructed hybrid UPDATE/DELETE statement, as permitted by the particular DBMS used.

Referring still to the embodiment of FIG. 2, the identification (step 202), from the change stream 109, of modifications statements that affect a single table and are of the same type, may be achieved by any of various data sanitizing, queuing, batching, and/or verifying techniques, some of which are described below. Thus, modifications for different tables and of different types may be sorted into groups of modifications of the same type for the same table. In some embodiments, the method may include determining that each of the plurality of row-level modifications includes a DELETE operation for one of the one or more target database rows. In some embodiments, the method may include determining that each of the plurality of row-level modifications includes an UPDATE operation for one of the one or more target database rows, wherein the UPDATE operation identifies an update value for one or more of the one or more target database columns. Where the row-level modifications are all UPDATEs, the method may include determining that the update value is identical for the plurality of row-level modifications; alternatively, more sophisticated statement generation may be applied to handle groupings of UPDATEs that identify different update values.

Referring still to the embodiment of FIG. 2, at step 204, the streaming analytics program 101 determines that each of the plurality of row-level modifications affects one or more common columns of the one or more target database columns. The one or more common columns exhibit one or more common values for those of the one or more target database rows that are affected by the plurality of row-level modifications. At step 206, the streaming analytics program 101 generates, based on the one or more common values and the one or more common columns, a reconstructed modification statement. Identifying the common columns and common values (step 204) and generating the reconstructed modification statement (step 206) are shown by the below examples.

TABLE 1

| TabA | | |
| --- | --- | --- |
| Col1 | Col2 | Col3 |
| 1 | abc | open |
| 2 | abc | open |
| 3 | def | open |
| 4 | abc | open |

TABLE 2

| TabB | | |
| --- | --- | --- |
| BeforeCol1 | BeforeCol2 | BeforeCol3 |
| 1 | abc | open |
| 2 | abc | open |
| 3 | def | open |
| 4 | abc | open |

TABLE 3

| TabB | | |
| --- | --- | --- |
| AfterCol1 | AfterCol2 | AfterCol3 |
| 1 | ghi | open |
| 2 | ghi | open |
| 3 | ghi | open |
| 4 | ghi | open |

Table 1 displays some example rows of data that may have been identified in row-level changes for DELETEs. Table 1 may be taken as only those rows that are identified by the row-level changes, as opposed to all of the rows in the full source database table or target database table. In Table 1, Col1 exhibits a cardinality of four, Col2 exhibits a cardinality of two, and Col3 exhibits a cardinality of one. In applying step 204, the streaming analytics program 101 may observe these cardinalities and take Col3 as the common column, since it has a cardinality of one. The single value exhibited by Col3 among the rows identified for deletion in the row-level modifications is "open". Thus, the streaming analytics program 101 may reconstruct (step 206) the modification statement: DELETE from TabA WHERE col3="open".

Table 2 displays a before image for some rows of data that may have been identified in row-level changes for UPDATEs. Table 3 displays an after image of the same rows. In Table 3, the after image, Col2 and Col3 both exhibit a cardinality of one, but in Table 2, the before image, only Col3 exhibits the low cardinality on a common value "open". Similarly, Col2 is different from Table 2 to Table 3. Therefore, the streaming analytics program may reconstruct a modification statement: UPDATE TabB SET Col2="ghi" WHERE Col3="open".

In the example of Table 2 and Table 3, above, the before image and after image are taken as existing. In some embodiments, the streaming analytics program 101 generates a before image for the target database table, for example by querying the target DBMS 106. The before image includes a state of the target database table with the plurality of row-level modifications not applied, and the before image includes one or more before rows and one or more before columns. In such embodiments, the streaming analytics program 101 generates a cardinality for each of the one or more before columns, based only on those of the one or more before rows that are identified by the plurality of row-level modifications. The streaming analytics program 101 may, for any of the one or more before columns, responsive to the cardinality being below a threshold, identify that of the one or more before columns as one of the one or more common columns.

Thus, a cardinality of one is not required. Rather, the threshold may be set at a cardinality of two, three, four up to n, where n is an integer number of uniquely exhibited values. This may be a configurable parameter in embodiments allowing cardinalities larger than one. Where cardinalities greater than one are used to identify the common column(s), the WHERE phrase of the reconstructed modification statement may be produced by joining the distinct common values with OR—that is, disjunctively.

In various embodiments, the streaming analytics program 101 may check the quality of the reconstructed modification statement by executing a query (i.e., a SELECT statement, or, for non-relational databases, an operation equivalent of a SELECT statement) on the target DBMS 106. To achieve this, the streaming analytics program 101 may take the reconstructed modification statement as including an operational clause (i.e., DELETE or UPDATE and associated from and/or SET parameters) and a WHERE clause. The streaming analytics program 101 may query the target database table using the WHERE clause to yield a test payload. The streaming analytics program 101 may generate a test row count for the test payload. The streaming analytics program 101 may generate a batch row count for the plurality of row-level modifications. These row counts may be achieved by iteratively inspecting the row-level modifications and the test payload, or they may be readily available through existing functions of the target DBMS 106 or may be previously calculated in identifying the data.

Responsive to the test row count and the batch row count being equivalent to within a predetermined tolerance, the streaming analytics program 101 may apply the reconstructed modification statement to the target database table in place of the plurality of row-level modifications. In the depicted implementation, "apply" may include causing the apply component 112 to apply the reconstructed modification statement, or integrating the apply component 112 into the streaming analytics component 102. The predetermined tolerance may be a configurable parameter, and an exemplary value for the predetermined tolerance may be 5%. It should be noted that the streaming analytics component 102 may operate asynchronously from both the source database table and the target database table. For this reason, it cannot be assumed that the test payload and the contents of target database table will behave identically. Thus, such embodiments use a predetermined tolerance to determine whether the reconstructed modification statement is a good estimate.

Referring still to the embodiment of FIG. 2, at step 208, the streaming analytics program sends the reconstructed modification statement to the apply component 112 (for example, as depicted in FIG. 1). The reconstructed modification statement may be sent together with a count or list of the affected row-level modifications. Thus the apply component 112 may use the reconstructed modification statement to optimize application of the row-level modifications to the target DBMS 106, as described below.

Figure 3:
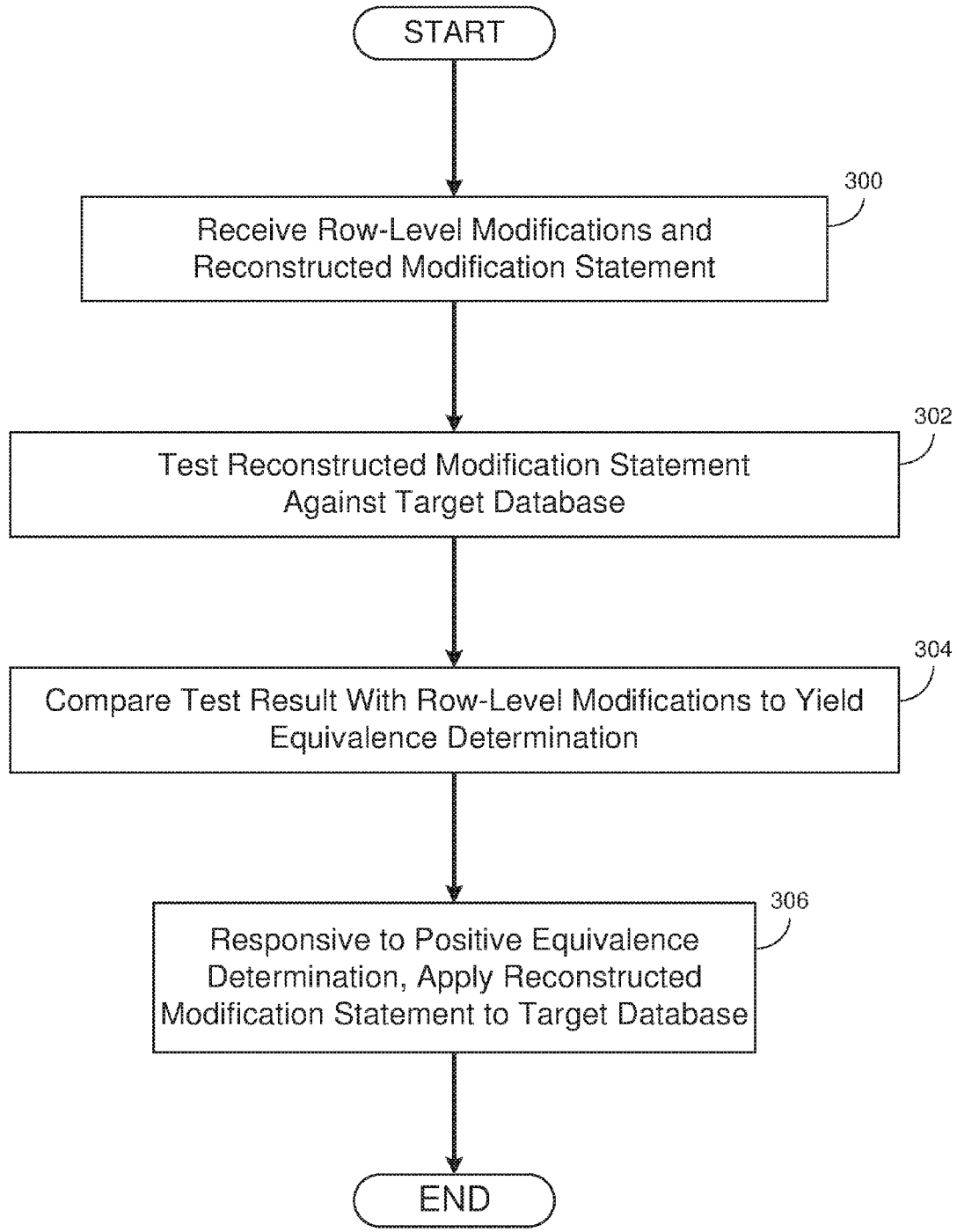
FIG. 3 is a flowchart diagram for a hint processing program, in accordance with at least one embodiment of the present invention.

Referring now to FIG. 3, FIG. 3 depicts a flowchart for a hint processing program 113, which operates in the context of the apply component 112 and/or the target DBMS 106, in accordance with at least one embodiment of the invention. In particular, the functions of the hint processing program 113 are closely integrated with those of a target DBMS 106 and may be understood as being performed by a database management system that manages a target database table. The database management system may be broadly understood to include at least the apply component 112, if not the entire replication architecture and source DBMS 104. Equivalently, the database management system may be understood as including a change data replication apply component 112, as described above. Thus, at step 300, the hint processing program 113 receives a plurality of row-level modifications. Each of the plurality of row-level modifications is for the target database table. Further at step 300, the hint processing program 113 receives a reconstructed modification statement. The reconstructed modification statement includes an operational clause and a WHERE clause, as described above.

Referring still to the embodiment depicted in FIG. 3, at step 302, the hint processing program 113 tests the reconstructed modification statement against the target database table to yield a test result. More specifically, the hint processing program may query the target database table based on and/or using the WHERE clause to yield a test payload. At step 304, the hint processing program 113 compares the test result with the plurality of row-level modifications to yield an equivalence determination. In some embodiments, the equivalence determination may represent a guaranty that the reconstructed modification statement is row-for-row equivalent to the plurality of row-level modifications. To achieve such a guaranty, the hint processing program 113 may perform step 304 (comparing the test result with the plurality of row-level modifications to yield an equivalence determination) synchronously with the target database table. In other embodiments, comparing the test result with the plurality of row-level modifications may include less restrictive comparisons, such as equivalence to within a predetermined tolerance or at least a certain number of rows matching.

Referring still to the embodiment depicted in FIG. 3, at step 306, the hint processing program 113, responsive to the equivalence determination being positive, applies the reconstructed modification statement to the target database table in place of the plurality of row-level modifications. Contrastingly, responsive to the equivalence determination being negative, the hint processing program 113 may apply the plurality of row-level modifications to the target database table in place of the reconstructed modification statement.

With synchronous processing, it becomes possible to require an exact match between the effects of the row-level modifications and the reconstructed modification statement because the target database table is guaranteed not to change during the analysis by the hint processing program 113. In such embodiments, the hint processing program 113 may query the target database table using the WHERE clause to yield a test payload, generate a test row count for the test payload, generate a batch row count for the plurality of row-level modifications, and responsive to the test row count and the batch row count being exactly equal, determine the equivalence determination to be positive. Thus, the reconstructed modification statement is proven to be equivalent to the plurality of row-level modifications.

In an alternative embodiment, the hint processing program 113 may use transactions on the target DBMS 106 in lieu of querying to generate a test payload. In the context of relational and non-relational DBMSs, transactions allow for several operations to be grouped together as an atomistic unit such that the entire series is executed together or not at all. Where the entire group of operation cannot all be completed, the transaction system rolls the DBMS state back to before the transaction began. In such embodiments, step 302 (testing the reconstructed modification statement against the target database table to yield a test result) includes initiating a transaction and applying the reconstructed modification statement to the target database table. The comparison may be achieved by comparing the live image of the target database table with the row-level modification statements—In particular the count of changed rows may be compared to the count of row-level modifications. In such embodiments, step 306 (applying the reconstructed modification statement to the target database table in place of the plurality of row-level modifications) includes committing the transaction. Similarly, in such embodiments, responsive to the equivalence determination being negative, the hint processing program rolls back the transaction, and, in that case, applies the plurality of row-level modification statements in place of the reconstructed modification statement.

Figure 4:
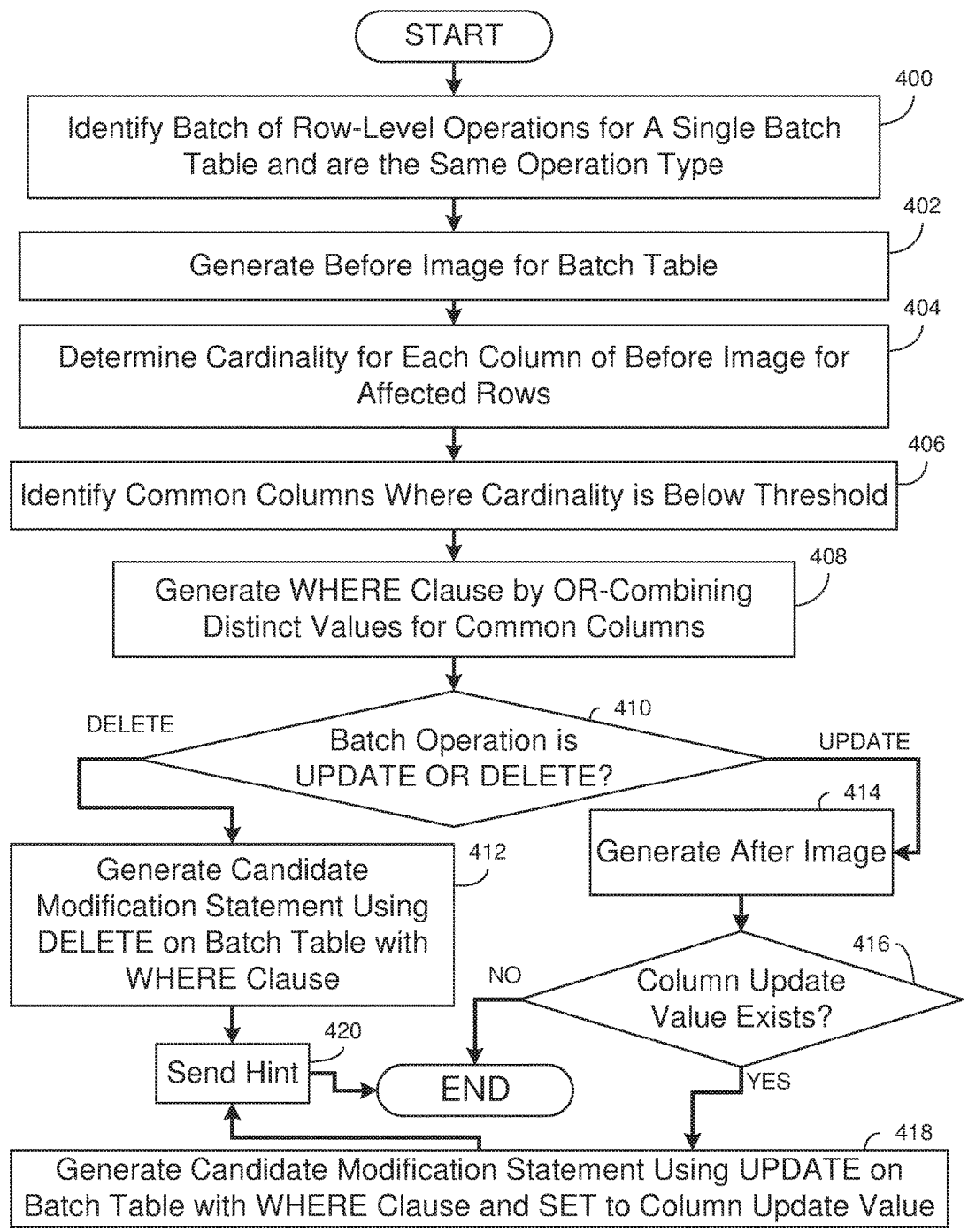
FIG. 4 is a flowchart diagram for an alternative streaming analytics program, in accordance with at least one embodiment of the present invention.

Referring now to FIG. 4, FIG. 4 is a flowchart diagram for an alternative embodiment of the streaming analytics program 101. In the depicted embodiment, the streaming analytics program 101 takes specific account of row-level change data that is not assumed to affect the same table of the target DBMS 106, is not assumed to be all of the same type (i.e., UPDATE or DELETE), and, for UPDATES, is not assumed to have the same update value for all columns. In the depicted embodiment, the streaming analytics program 101 identifies a change stream 109. The change stream 109 is being transmitted from a source database to a target database, for example databases managed by the source DBMS 104 and target DBMS 106. The change stream 109 includes one or more change data rows. At step 400, the streaming analytics program 101 identifies a batch.

To identify a batch, for each row-level operation of the one or more change data rows, the streaming analytics program 101 determines that the row-level operation is for a target table (of the target database), identifies an operation type (either UPDATE or DELETE), and determines, for the target table and the operation type, whether a batch is open. Responsive to no batch being open for the target table and the operation type, the streaming analytics program 101 opens a batch for the target table and the operation type. With the batch open, whether preexisting or just-instantiated, he streaming analytics program 101 adds the row-level operation to the batch. The batch may be implemented a queue, linked list, stack, array, or other linear data structure. The ordering of the batch may be First In First Out (FIFO), First In Last Out (FILO), or otherwise. The streaming analytics program 101 may close a batch when it reaches a predetermined size or when a predetermined period of time has passed. Upon closing the batch, the streaming analytics program 101 may proceed with analyzing that particular batch.

For each batch, the streaming analytics program 101 identifies a batch operation (either UPDATE or DELETE, whichever operation type represents all operations in the batch). The batch table may be understood to include one or more batch table rows and one or more batch table columns. At step 402, the streaming analytics program 101 generates a before image for the batch table. The before image includes a first state of the batch table the batch not applied to the batch table. The before image may be generated simply by executing a SELECT or equivalent query for all rows and columns on the batch table, of for all columns on only the rows that are affected by the operations in the batch. For each of the one or more batch table columns, at step 404, the streaming analytics program 101 determines a cardinality among those of the one or more batch table rows that are affected by the batch, based on the before image. Cardinality for a column may be determined by counting the number of unique values that are exhibited by all affected rows in that columns. At step 406, the, the streaming analytics program 101 identifies one or more common columns, wherein each of the one or more common columns has its cardinality less than a predetermined threshold. The threshold cardinality may be set at anything greater than 1, requiring an exact match of all values, or it may be set larger, allowing for multiple values to be combined. Such may be set as the default value in embodiments where the threshold is configurable parameter, thus allowing for manual tuning of the streaming analytics program 101.

At step 408, the streaming analytics program 101, generates a WHERE clause, wherein the WHERE clause references each of the one or more common columns by a column phrase, and wherein each column phrase disjunctively references all values for that of the one or more common columns that is exhibited for any of the one or more batch table rows that are affected by the batch. For example, if a common column, col1, has distinct values "red", "blue" and "green" in the affected rows, and another common column, col2, has distinct values "April" and "August", then the WHERE clause would be: WHERE (col1="red" OR col1="blue" OR col1="green") AND (col2="April" OR col2="August"). Thus, the column phrase includes the disjunctively joined (i.e., with "OR") exhibited values for the column, and the column phrases, if more than one, are joined conjunctively with "AND". By disjunctively referencing all values in each common column, but conjunctively referencing all common columns, the streaming analytics program 101 ensures that the constructed WHERE clause captures the observed change data for the batch.

At decision block 410, responsive to the batch operation type being DELETE, the streaming analytics program 101 generates (step 412) a candidate modification statement for the batch. The candidate modification statement includes a DELETE statement on the batch table using the WHERE clause. In the above example, if col1 and col2 are both in the same batch table, table1, the DELETE statement may read: DELETE from table1 WHERE (col1="red" OR col1="blue" OR col1="green") AND (col2="April" OR col2="August").

At decision block 410, responsive to the batch operation type being UPDATE, the streaming analytics program 101 generates an after image (step 414). The after image includes a second state of the batch table with the batch applied to the batch table. This may be achieved by taking the before image and entering the row-level changes outside of the production database. Because the after image is generated outside of the production database, the data need not be sanitized, checked, or run in any transaction, and thus the analysis may be faster than row-wise entry on the production database. In alternative embodiments, if the streaming analytics program 101 has access to the target DBMS 106, then the after image may be generated by running the row-wise queries as a transaction. In the depicted embodiment, the streaming analytics program compares, row-wise, the after image with the before image to identify one or more changed rows.

At decision block 416, the streaming analytics program 101 determines, for each of the one or more batch table columns, whether there exists a column update value. The column update value is common to all of the one or more changed rows. Responsive to the column update value not existing for any change data row the batch, the streaming analytics program 101 abandons the batch (decision block 416, NO branch). Abandoning the batch may include releasing its corresponding data structure and not sending a hint to the apply component 112. An embodiment of the hint processing program 113 may be configured to receive and process an affirmative message from the streaming analytics program 101 that one or more change data rows will have no hint, or it may be configured to accept hints that may or may not arrive within a predetermined period of time.

Responsive to the column update value existing, at step 418, the streaming analytics program 101 generates a candidate modification statement for the batch. The candidate modification statement includes an UPDATE statement on the batch table using the WHERE clause and a SET clause that identifies each column update value. In the above example, if the after image shows another column, col3, is set to 9 and a col4 is set to "water" in all change rows, then the candidate modification statement would be: UPDATE table1 SET col3=9, col4="water" WHERE (col1="red" OR col1="blue" OR col1="green") AND (col2="April" OR col2="August".

At step 420, the streaming analytics program 101 generates a hint and sends the hint to the apply component 112. The hint includes the candidate modification statement and a metadata as to the batch. The metadata may include a batch row count for the batch. The metadata may, alternatively, identify which of the one or more change data rows are included in the batch.

Referring still to the embodiment of FIG. 4, the streaming analytics program 101 to the target DBMS 106, may query the target database using the WHERE clause to yield a test payload, generate a test row count for the test payload (number of rows returned in the query), generate a batch row count for the batch (number of rows affected by the batch), and, responsive to the test row count and the batch row count being equivalent to within a predetermined tolerance (e.g., 5%), apply the candidate modification statement to the target database in place of the batch. Such applying may be done directly, if the streaming analytics program 101 is sufficiently logically near the target DBMS 106, or via the apply component 112. Applying may include committing, as in closing a transaction, or making a test application before committing the changes, as described above.

FIG. 5 is a block diagram depicting components of a computer 500 suitable for executing the streaming analytics program 101 and the hint processing program 113. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the streaming analytics program 101 and the hint processing program 113 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The streaming analytics program 101 and the hint processing program 113 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, by a streaming analytics component:
   identifying a source database table and a target database table, said target database table comprising one or more target database rows and one or more target database columns;
   identifying a change stream, said change stream comprising a plurality of row-level modifications, wherein application of said plurality of row-level modifications to said target database table causes said target database table to replicate said source database table;
   determining that each of said plurality of row-level modifications affects one or more common columns of said one or more target database columns, wherein said one or more common columns exhibit one or more common values for those of said one or more target database rows that are affected by said plurality of row-level modifications;
   generating, based on said one or more common values and said one or more common columns, a reconstructed modification statement; and
   sending said reconstructed modification statement to an apply component.

2. The computer-implemented method of claim 1, further comprising determining that each of said plurality of row-level modifications comprises a DELETE operation for one of said one or more target database rows.

3. The computer-implemented method of claim 1, further comprising:
   determining that each of said plurality of row-level modifications comprises an UPDATE operation for one of said one or more target database rows, wherein said UPDATE operation identifies an update value for one or more of said one or more target database columns.

4. The computer-implemented method of claim 3, wherein said update value is identical for said plurality of row-level modifications.

5. The computer-implemented method of claim 1, wherein determining that each of said plurality of row-level modifications affects said one or more common columns comprises:
   generating a before image for said target database table, said before image comprising a state of said target database table with said plurality of row-level modifications not applied, and said before image comprising one or more before rows and one or more before columns;
   generating a cardinality for each of said one or more before columns, based only on those of said one or more before rows that are identified by said plurality of row-level modifications; and
   for any of said one or more before columns, responsive to said cardinality being below a threshold, identifying that of said one or more before columns as one of said one or more common columns.

6. The computer-implemented method of claim 1, wherein said reconstructed modification statement comprises an operational clause and a WHERE clause, and further comprising:
   querying said target database table using said WHERE clause to yield a test payload;
   generating a test row count for said test payload;
   generating a batch row count for said plurality of row-level modifications; and
   responsive to said test row count and said batch row count being equivalent to within a predetermined tolerance, applying said reconstructed modification statement to said target database table in place of said plurality of row-level modifications.

7. The computer-implemented method of claim 1, wherein said streaming analytics component operates asynchronously from both said source database table and said target database table.

8. A computer-implemented method comprising, by a database management system, wherein said database management system manages a target database table:
   receiving a plurality of row-level modifications, each of said plurality of row-level modifications being for said target database table;
   receiving a reconstructed modification statement, wherein said reconstructed modification statement comprises an operational clause and a WHERE clause;
   testing said reconstructed modification statement against said target database table to yield a test result;
   comparing said test result with said plurality of row-level modifications to yield an equivalence determination; and
   responsive to said equivalence determination being positive, applying said reconstructed modification statement to said target database table in place of said plurality of row-level modifications.

9. The computer-implemented method of claim 8, further comprising:
   responsive to said equivalence determination being negative, applying said plurality of row-level modifications to said target database table in place of said reconstructed modification statement.

10. The computer-implemented method of claim 8, wherein testing said reconstructed modification statement against said target database table to yield a test result comprises querying said target database table based on said WHERE clause to yield a test payload.

11. The computer-implemented method of claim 8, wherein:
   testing said reconstructed modification statement against said target database table to yield a test result comprises:
      initiating a transaction; and
      applying said reconstructed modification statement to said target database table; and
   applying said reconstructed modification statement to said target database table in place of said plurality of row-level modifications comprises committing said transaction.

12. The computer-implemented method of claim 11, further comprising, responsive to said equivalence determination being negative:

rolling back said transaction; and applying said plurality of row-level modification statements in place of said reconstructed modification statement.

13. The computer-implemented method of claim 8, wherein:

comparing said test result with said plurality of row-level modifications to yield an equivalence determination is performed synchronously with said target database table.

14. The computer-implemented method of claim 13, wherein comparing said test result with said plurality of row-level modifications to yield an equivalence determination comprises:

querying said target database table using said WHERE clause to yield a test payload;

generating a test row count for said test payload;

generating a batch row count for said plurality of row-level modifications; and responsive to said test row count and said batch row count being exactly equal, determining said equivalence determination to be positive;

whereby said reconstructed modification statement is proven to be equivalent to said plurality of row-level modifications.

15. The computer-implemented method of claim 8, wherein said database management system comprises a change data replication apply component.

16. A computer-implemented method comprising:

identifying a change stream, said change stream being transmitted from a source database to a target database, and said change stream comprising one or more change data rows;

for each row-level operation of said one or more change data rows:

determine that said row-level operation is for a target table, said target table being of said target database;

identify an operation type for said row-level operation, said operation type being either UPDATE or DELETE;

determining, for said target table and said operation type, whether a batch is open;

responsive to no said batch being open for said target table and said operation type, opening said batch for said target table and said operation type; and adding said row-level operation to said batch;

for each said batch:

identifying, for said batch, a batch operation type and a batch table, said batch table comprising one or more batch table rows and one or more batch table columns;

generating a before image for said batch table, said before image comprising a first state of said batch table with said batch not applied to said batch table;

for each of said one or more batch table columns, determining a cardinality among those of said one or more batch table rows that are affected by said batch, based on said before image;

identifying one or more common columns, wherein each of said one or more common columns has said cardinality less than a predetermined threshold;

generating a WHERE clause, wherein said WHERE clause references each of said one or more common columns by a column phrase, and wherein each said column phrase disjunctively references all values for that of said one or more common columns that is exhibited for any of said one or more batch table rows that are affected by said batch;

responsive to said batch operation type being DELETE, generating a candidate modification statement for said batch, said candidate modification statement comprising a DELETE statement on said batch table using said WHERE clause;

responsive to said batch operation type being UPDATE:

generating an after image, said after image comprising a second state of said batch table with said batch applied to said batch table;

comparing, row-wise, said after image with said before image to identify one or more changed rows;

determining, for each of said one or more batch table columns, whether there exists a column update value, said column update value being common to all of said one or more changed rows;

responsive to said column update value not existing for any change data row of said batch, abandoning said batch;

responsive to said column update value existing, generating a candidate modification statement for said batch, said candidate modification statement comprising an UPDATE statement on said batch table using said WHERE clause and a SET clause that identifies each said column update value;

generating a hint, said hint comprising said candidate modification statement and a metadata as to said batch; and sending said hint to an apply component.

17. The computer-implemented method of claim 16, wherein said predetermined threshold is a configurable parameter.

18. The computer-implemented method of claim 16, further comprising:

querying said target database using said WHERE clause to yield a test payload;

generating a test row count for said test payload;

generating a batch row count for said batch; and responsive to said test row count and said batch row count being equivalent to within a predetermined tolerance, applying said candidate modification statement to said target database in place of said batch.

19. The computer-implemented method of claim 16, wherein said metadata comprises a batch row count for said batch.

20. The computer-implemented method of claim 16, wherein said metadata identifies which of said one or more change data rows are included in said batch.

* * * * *